US010880685B2

(12) United States Patent
Marino et al.

(10) Patent No.: US 10,880,685 B2
(45) Date of Patent: Dec. 29, 2020

(54) PROVISIONING CONTENT ACROSS MULTIPLE DEVICES

(71) Applicant: Facebook, Inc., Menlo Park, CA (US)

(72) Inventors: Addie Louise Marino, Brooklyn, NY (US); Lorena M. Ospina, Long Island City, NY (US); Keenan Christopher Pridmore, Wilmette, IL (US)

(73) Assignee: Facebook, Inc., Menlo Park, CA (US)

( * ) Notice: Subject to any disclaimer, the term of this patent is extended or adjusted under 35 U.S.C. 154(b) by 209 days.

(21) Appl. No.: 15/969,011

(22) Filed: May 2, 2018

(65) Prior Publication Data

US 2019/0215650 A1 Jul. 11, 2019

Related U.S. Application Data

(60) Provisional application No. 62/614,971, filed on Jan. 8, 2018.

(51) Int. Cl.
*H04W 4/02* (2018.01)
*H04W 4/21* (2018.01)
(Continued)

(52) U.S. Cl.
CPC ............. *H04W 4/023* (2013.01); *H04L 67/18* (2013.01); *H04W 4/21* (2018.02); *H04L 67/306* (2013.01); *H04W 4/08* (2013.01); *H04W 4/80* (2018.02)

(58) Field of Classification Search
None
See application file for complete search history.

(56) References Cited

U.S. PATENT DOCUMENTS

2008/0216125 A1 9/2008 Li
2011/0282989 A1* 11/2011 Geirhofer ............. H04W 8/005
709/224

(Continued)

FOREIGN PATENT DOCUMENTS

EP 2251856 A2 11/2010
EP 2251856 A3 6/2011
(Continued)

OTHER PUBLICATIONS

International Preliminary Report on Patentability and Written Opinion for International Application No. PCT/US2018/046672, dated Jul. 23, 2020.

(Continued)

*Primary Examiner* — Chris Parry
*Assistant Examiner* — Abderrahmen Chouat
(74) *Attorney, Agent, or Firm* — Baker Botts L.L.P.

(57) ABSTRACT

A method of generating respective adaptations of digital content for display by multiple computing devices is recited. In one embodiment, a server determines whether multiple client computing devices are in physical proximity to one another. If multiple computing devices are in physical proximity to one another, respective adaptations of digital content are generated. Each respective content adaptation presents a different content view which is configured for a specific one of the computing devices. Each content adaptation is configured for synchronous presentation on the computing devices with the other content adaptations. The content adaptations are then sent to the computing devices.

18 Claims, 11 Drawing Sheets

(51) Int. Cl.
*H04W 4/08* (2009.01)
*H04W 4/80* (2018.01)
*H04L 29/08* (2006.01)

(56) References Cited

U.S. PATENT DOCUMENTS

| | | | |
|---|---|---|---|
| 2012/0062442 A1 | 3/2012 | Locker | |
| 2013/0176255 A1 | 7/2013 | Kim | |
| 2014/0073244 A1* | 3/2014 | Ko | H04L 69/14 455/41.1 |
| 2014/0197232 A1* | 7/2014 | Birkler | H04L 63/08 235/375 |
| 2014/0244745 A1 | 8/2014 | Murarka | |
| 2014/0313103 A1 | 10/2014 | Goel | |
| 2015/0061971 A1* | 3/2015 | Choi | G06F 3/1446 345/2.3 |
| 2016/0055473 A1 | 2/2016 | Lin | |
| 2016/0224184 A1 | 8/2016 | Nordback | |
| 2017/0193552 A1 | 7/2017 | Wang | |
| 2017/0238132 A1 | 8/2017 | Dobyns | |
| 2018/0124570 A1* | 5/2018 | Kannan | H04W 4/023 |

FOREIGN PATENT DOCUMENTS

| | | |
|---|---|---|
| EP | 2495644 A1 | 9/2012 |
| EP | 2674901 A1 | 12/2013 |
| EP | 2887204 A1 | 6/2015 |
| EP | 2937856 A1 | 10/2015 |
| EP | 3166099 A2 | 5/2017 |
| EP | 3166099 A3 | 7/2017 |
| JP | 2007124025 A | 5/2007 |
| JP | 2012048035 A | 3/2012 |
| JP | 2012133068 A | 7/2012 |
| KR | 20140080224 | 6/2014 |
| KR | 20150043373 A | 4/2015 |
| KR | 20150087980 A | 7/2015 |
| WO | WO 2011057271 A1 | 5/2011 |
| WO | WO 2017113776 A1 | 7/2017 |

OTHER PUBLICATIONS

International Search Report and Written Opinion for International Application No. PCT/US2018/046672, dated Jan. 9, 2019.
EP Communication received from EPO for Patent Application No. 18205095.5-1222, dated Feb. 19, 2020.
EESR received from EPO for EP Patent Application No. 18205095.5-1222, dated Jan. 21, 2019.

* cited by examiner

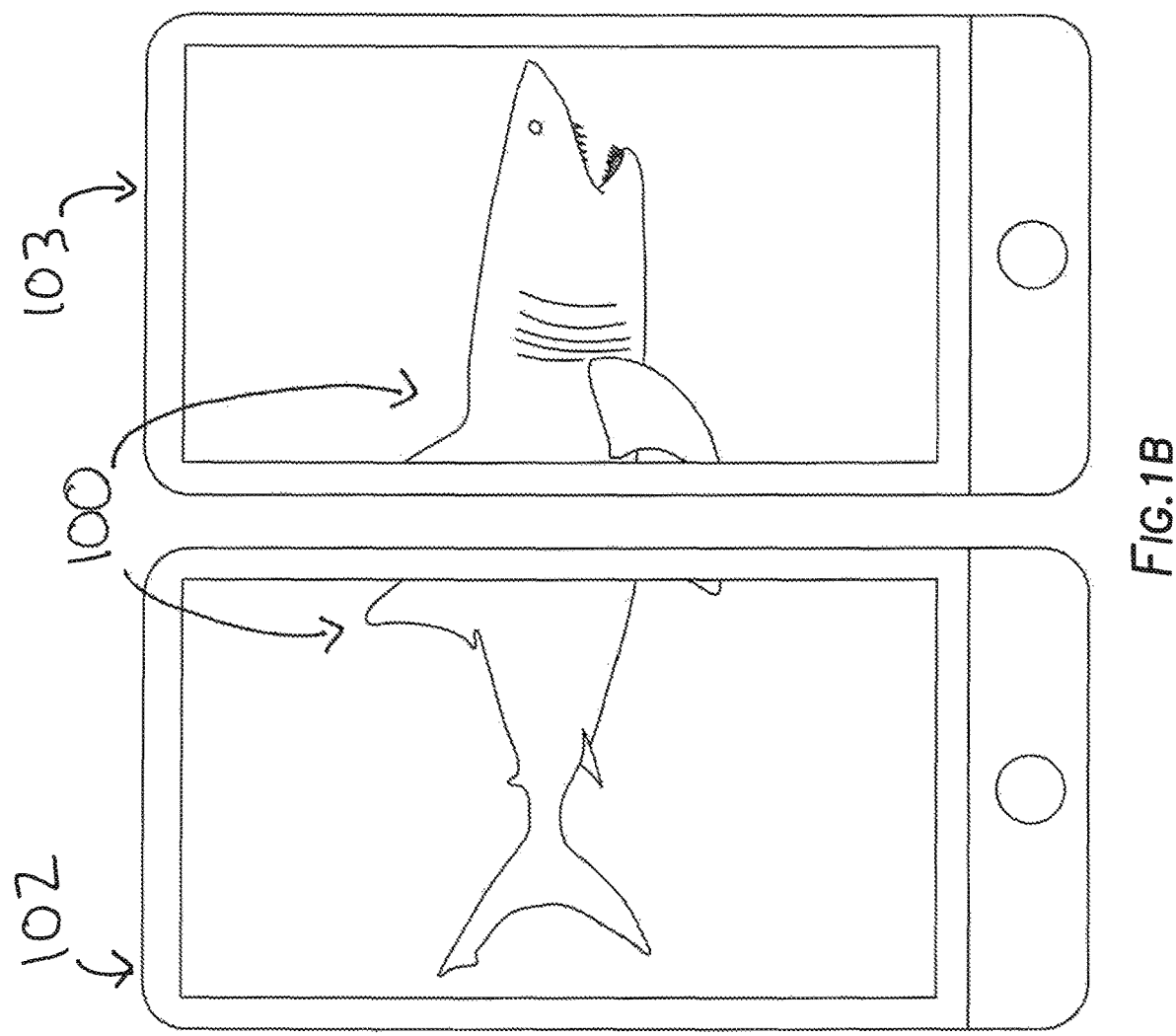

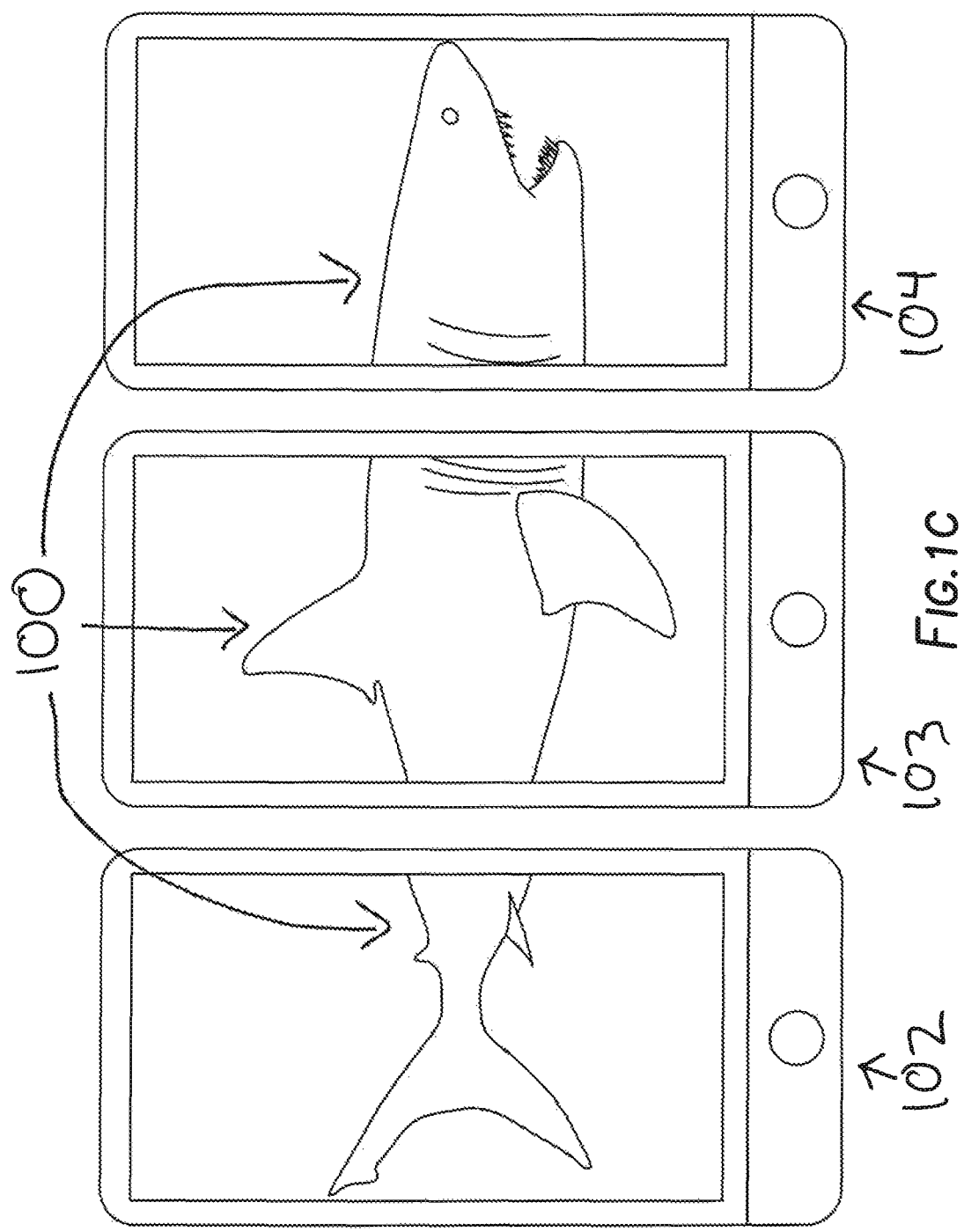

US 10,880,685 B2

PROVISIONING CONTENT ACROSS MULTIPLE DEVICES

PRIORITY

This application claims the benefit, under 35 U.S.C. § 119(e), of U.S. Provisional Patent Application No. 62/614,971, filed 8 Jan. 2018, which is incorporated herein by reference.

TECHNICAL FIELD

This disclosure generally relates to providing digital content.

BACKGROUND

A mobile computing device—such as a smartphone, tablet computer, or laptop computer may also execute software applications, such as games, web browsers, or social-networking applications. With social-networking applications, users may connect, communicate, and share information with other users in their social networks.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to present to a user, such as a newsfeed of aggregated stories of other users connected to the user.

A user of a mobile computing device may use the computing device to consume digital content (e.g., photos, videos, games, etc.). When two or more users of computing devices are together in the same physical space, a first user may use his or her computing device to allow one or more of the other users to consume digital content. Similarly, one or more of the other users may utilize their respective devices to allow the first user or any number of the other users to consume content from the respective devices. A user of a social-networking system may also utilize the social-networking system and a computing device to share digital content through the social-networking system with one or more other users, so that those users may consume the digital content.

SUMMARY OF PARTICULAR EMBODIMENTS

This disclosure generally relates to encouraging users to interact with friends to gather together in real life to jointly consume content which exists in a digital space. More specifically, embodiments of this invention contemplate requiring multiple users to congregate in the same physical space in order to use their respective computing devices (e.g., mobile phones) to cooperatively stream digital content.

In particular embodiments, some or all of the users may need to be physically present before the content may be unlocked. Some embodiments may take into account any number of computing device configurations or capacities (e.g., display size, display orientation, processing power) to determine which content will be presented and how that content will be presented. Similarly, some embodiments may take into account various user preferences, social network relationships between users, or environmental conditions to further adapt the content.

These embodiments and other features, aspects, and advantages of the disclosure are described in more detail below in the detailed description and in conjunction with the following figures.

The embodiments disclosed herein are only examples, and the scope of this disclosure is not limited to them. Particular embodiments may include all, some, or none of the components, elements, features, functions, operations, or steps of the embodiments disclosed above.

BRIEF DESCRIPTION OF THE DRAWINGS

FIG. 1B illustrates a first example method for utilizing multiple computing devices to present digital content.

FIG. 1C illustrates a second example method for utilizing multiple computing devices to present digital content.

DESCRIPTION OF EXAMPLE EMBODIMENTS

Figure 1A:
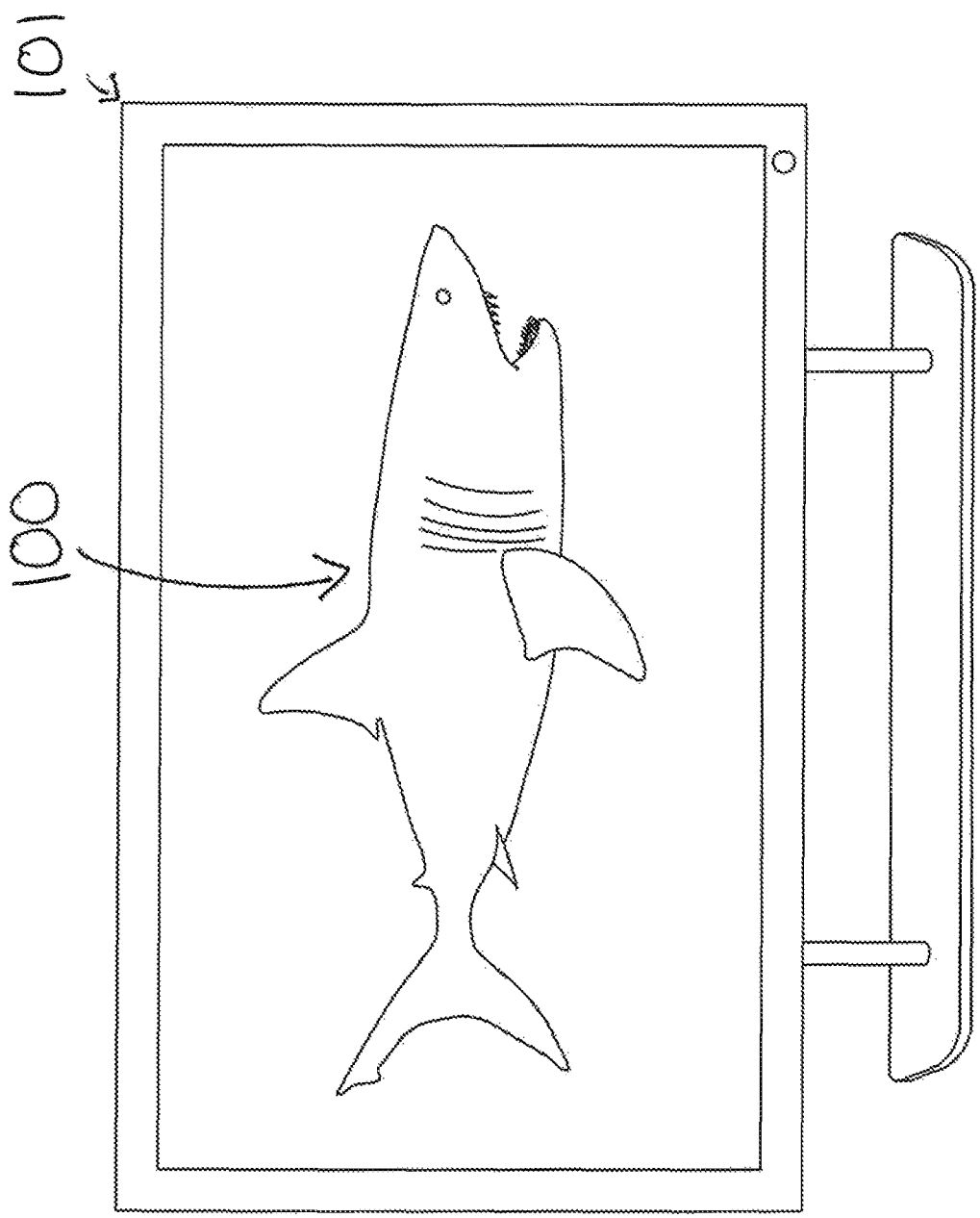
FIG. 1A illustrates digital media being presented on the display of a single computing device (prior art).

At a broad level, some embodiments of the invention may encourage users to interact with friends to jointly consume content which exists in a digital space, where the content is being consumed by the users who are together in the same physical space. To achieve this goal, embodiments of this invention contemplate requiring multiple users to congregate in the same physical space in order to use their respective computing devices (e.g., cell phones) to jointly consume digital content.

In particular embodiments, some or all of the users may need to be physically present before the content may be unlocked. Some embodiments may take into account any number of computing device configurations (e.g., display size or display orientation) to determine which content will be presented and how that content will be presented. Similarly, some embodiments may take into account various user preferences, social network relationships between users, and environmental conditions to further adapt the content.

Some embodiments may begin when a user engages with interactive code which may guide the user through a decision tree. The decision tree may require that the user input a number of preferences or selections, for example, the total number of users who will be jointly consuming the content, the names or social media profiles of the users who will be jointly consuming the content, the users' content preferences, the content to be consumed, etc. In some embodiments, the user may then be presented with one or more available content items. The nature or number of the one or more available content items may be influenced by factors such as the users' content preferences, the number of users, the types of computing devices, the capabilities or preferred orientations of those computing devices, or any number of additional factors, many of which are disclosed below. For example, certain content may only be available to groups of between five and seven users, whereas other content may be available to smaller groups of two or three users. Similarly, the available content or the way in which the content is presented may depend on the types of devices, the display size and display resolution of the devices, the bandwidth or cellular data provider of the devices, or any other capability of the computing devices. In some embodiments, the available content and the number of users/selection of users required to be present to unlock/consume the content may be automatically determined by a content provider.

Once the number of users and the content has been selected the system may generate a code on the device of the first user. This code may be used to verify that each computing device is in proximity to the first computing device. The code may be stored on a server and associated with the device of the first user, such that when the code is scanned by the device of a second, third, or Nth user, the server may automatically generate and send adapted content to each of the N users. At that point, the users may select to begin consuming the content. In some embodiments, such a code may not be necessary, because the devices may not require a server to ensure physical proximity or to adapt content for multiple devices. Instead, some embodiments may use a wireless, cellular, or other communication signal to automatically detect other computing devices that move into spatial proximity to the device of the first user and to adapt content to the devices that are present.

In some embodiments, users may be invited to congregate together in a virtual lobby. In some embodiments one or more of the users may be designated as a host who may have access to additional control or functionality over the experience. The host may also be the user who initiates consumption of the content. While in the lobby, the users may select virtual content. This virtual content may include episodes of a larger volume of content. Selection of an episode may be done manually or automatically. Additionally, in some embodiments, the status of the users who have congregated in the lobby may be displayed (e.g., "2 of 4 friends are ready"). Once all users in the lobby are ready, the host may be able to invoke play, causing all users' respective episodes to start playing concurrently. In some embodiments, only the host's audio may be audible and all other users' audio streams may be automatically muted. In other embodiments, all users' audio may be audible. In some embodiments this lobby-host model may be built in with a Firebase-powered data architecture that supports multiple episodes per experience and multiple experiences per brand partner. Tracking or analytics may be utilized develop records, statistics, and analysis on users' viewing history and preferences.

The content may be adapted in such a way that the orientation of the computing devices does not matter (e.g., each user's device may present a different "view" of the same scene or event). Alternatively, the content may be adapted in such a way that the orientation of the devices does matter. The system may present instructions—possibly using gamification techniques to encourage adherence to the instructions—to the users to assist them in placing their devices in the proper orientation. For example, if nine users have congregated to watch a movie, the system may direct them to place their phones in a three by three grid, each of the phones in landscape orientation, to create a much larger display on which they may watch the movie. The devices may also automatically monitor their own orientation and the orientation of the other devices and may send instructions to the server to adapt the content to the orientation of the devices in real time. The devices may automatically synchronize the presentation of content so that the content being presented by any one of the N devices is chronologically cooperative with the content presented by the other devices. The content may also be adapted and presented in such a way that it is not necessary for the presentation of the content to be synchronized across the computing devices. In some embodiments, users may be able to add or remove computing devices seamlessly during the presentation of content. In other embodiments, all computing devices may need to be present before content may be presented.

Some embodiments may require that two or more computing devices be in physical proximity to one another before the contemplated process may begin. Alternatively, some embodiments may allow for content to be adapted for a set number of users and computing devices while the computing devices are still remote to one another. In these embodiments, the content may be pre-generated so that when the computing devices come into proximity with one another, the users may begin consuming the content immediately. In some embodiments, if a first user tries to consume content on a computing device without the requisite number of computing devices in proximity, the computing device may generate a message, informing the user that one or more other computing devices must be in proximity to the first user's device in order for the first user to unlock and access the content. The system may also allow for a reminder to be set, so that the first user is reminded to attempt to access the content after a set amount of time, upon arrival to a particular geographic place, or when the first user's device detects the presence of another computing device. In particular embodiments, users may be able to schedule a time in which they intend to cooperatively consume digital content. In some embodiments, this may include selecting and preparing the content to be consumed, but delaying the presentation of the content until all users have gathered within physical proximity of one another.

As is noted above, the system may or may not actively listen for signals indicating that other computing devices have moved into proximity to a first computing device (either by a central server or by one or more of the computing devices). In some embodiments, such signals may include near field communication (NFC), infrared, Bluetooth Low Energy, radio-frequency identification, or any other type of signal or protocol. Such embodiments may, upon detecting a signal indicating that another computing device has moved into proximity, generate a message on the first computing device, notifying the first user that another user is nearby and that the content has been unlocked for consumption. Additionally, if two or more users are already consuming content on their respective computing devices and a third user enters their proximity, the device of the third user may prompt the third user to join in to the experience. Similarly, in some embodiments, if one or more of a group of two or more users leaves the group while the group is consuming content across the devices, the devices may automatically adapt to present the content only across the remaining computing devices. In some embodiments, several factors may affect whether a device notifies a user that other users are nearby or prompts a user to join in to an existing experience, such as, by way of example and not limitation, the type or capability of the computing devices, a user configuration, or a social affinity between the users.

In some embodiments, the content may be traditional content (e.g., a movie produced in the 1990s) that has been adapted for presentation on the multiple computing devices. In other embodiments, the content may have been produced specifically for presentation by particular embodiments. In some embodiments, the content may include text, images, video, audio, animation, games, augmented reality features/content, coupons, etc. In some embodiments, the content may be different based on the number or status of the computing devices that are present. For example, some content may only be accessible if four or more computing devices are present while other content may only be accessible to users who have co-consumed content with other users at least once before. In some embodiments, a computing device may not be included in the group if a battery status of the device is below a threshold or if the device display's capabilities do not exceed a minimum set of specifications. In addition to being adaptable to the number or status of the computing devices present, the content may be adaptable based on geospatial or physical environment factors (e.g., the weather at the location of the users); temporal factors (e.g., the time of day, day of week, or season); a current activity of the users (e.g., if the users are at a live event, they may gain access to behind the scenes footage from the event); whether or not the users have paid for the content or have agreed to view advertisements during the viewing experience; or based on any number of other factors.

FIG. 1A illustrates an example from the prior art in which digital content 100 is presented on the display of a single device 101. In this example, content from the movie "Jaws" may be presented on a TV. It is understood that the content could similarly be presented on the display of a smartphone, a tablet computer, a laptop computer, or any other device with a display and which is capable of presenting digital content.

FIG. 1B illustrates an example embodiment in which two computing devices may be used to cooperatively present related digital content. In this example embodiment, digital video 100 may be adapted to present portions of each frame of the video on each of the displays of the two computing devices 102 and 103, which may thus cooperatively create a single, larger display when placed next to each other. In some embodiments, the orientation of the computing devices may matter. In some embodiments, the orientation of the computing devices may not matter. In some embodiments, the computing devices may automatically monitor their own orientation and the orientation of the other devices and may send instructions to the server to adapt the content to the orientation of the devices in real time. As an example, in some embodiments, if computing devices 102 and 103 were each turned 180 degrees, the content would automatically adjust to the new orientation of the devices. In particular embodiments, the adapted content as presented on the devices in proximity may have a different aspect ratio than the original content.

FIG. 1C illustrates an example embodiment in which three computing devices are used to cooperatively present digital content. In this example, the digital content 100 is now adapted to present portions of each frame of the video on each of computing devices 102, 103, and 104. In particular embodiments, the cooperatively presented digital content may comprise audio (e.g., computing devices 102 and 103 may play the music for the percussion and strings sections of a symphony, and when computing device 104 joins the group, it may play the music for the brass section of the symphony).

Figure 2:
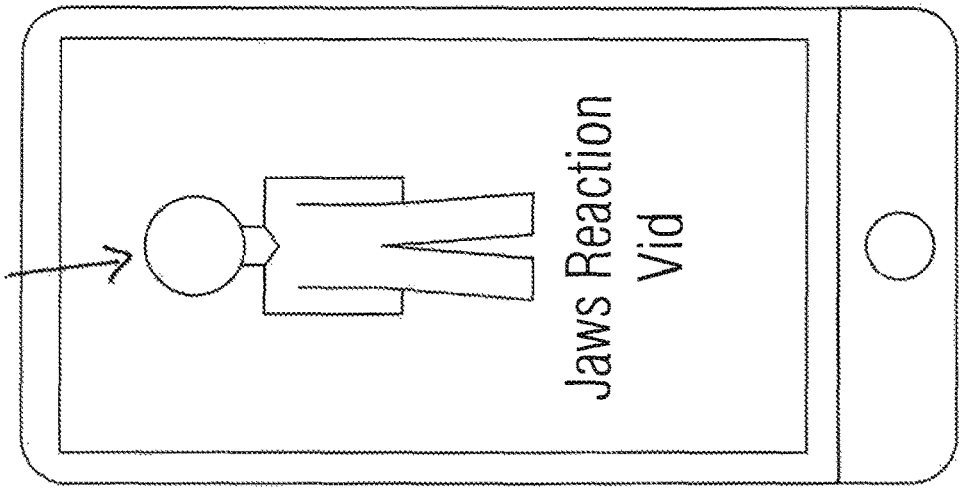
FIG. 2 illustrates an example method for utilizing multiple computing devices to present digital content, wherein the digital content presented by any one device may not be visually related to the digital content presented by the other devices.
Figure 2:
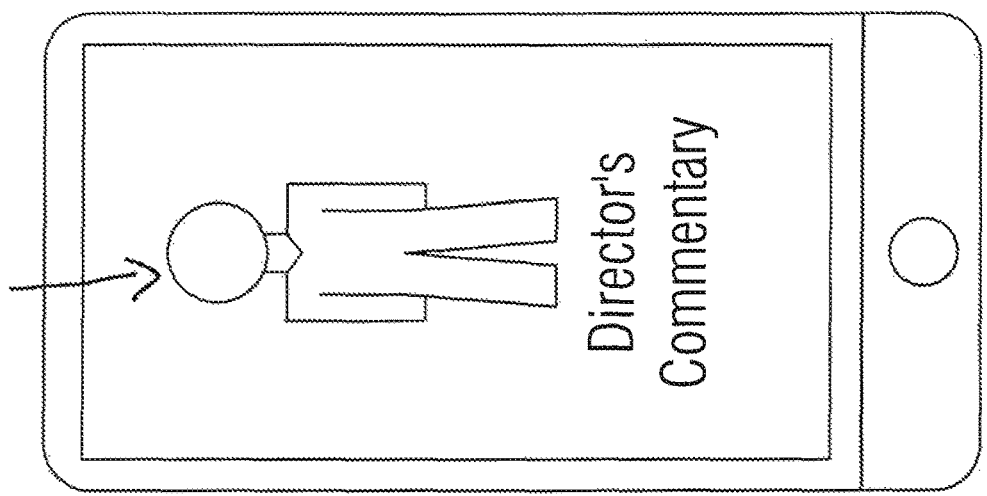
Figure 2:
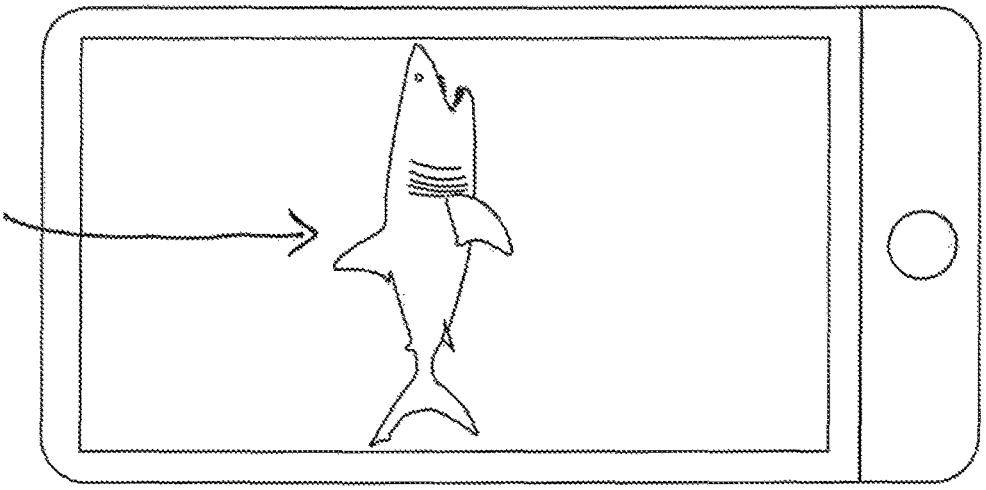

FIG. 2 illustrates an example embodiment in which the digital content presented by each computing device may not be portions of a single larger piece of content. In FIG. 2 computing devices 201, 202, and 203 may each present digital content wherein the content presented by each device may be related by subject matter but wherein the digital content presented by each device may be visually independent from the digital content presented by the other devices. As an example, computing device 201 may present the movie "Jaws" 200, while computing devices 202 and 203 may, as an example, present the director providing commentary 210 and a Jaws Reaction Video 220, respectively. As another example, in particular embodiments, the devices may present different interfaces for the same game. In particular embodiments, the three computing devices may each present the same scene from a movie or TV show but from a different angle or viewpoint.

Figure 3:
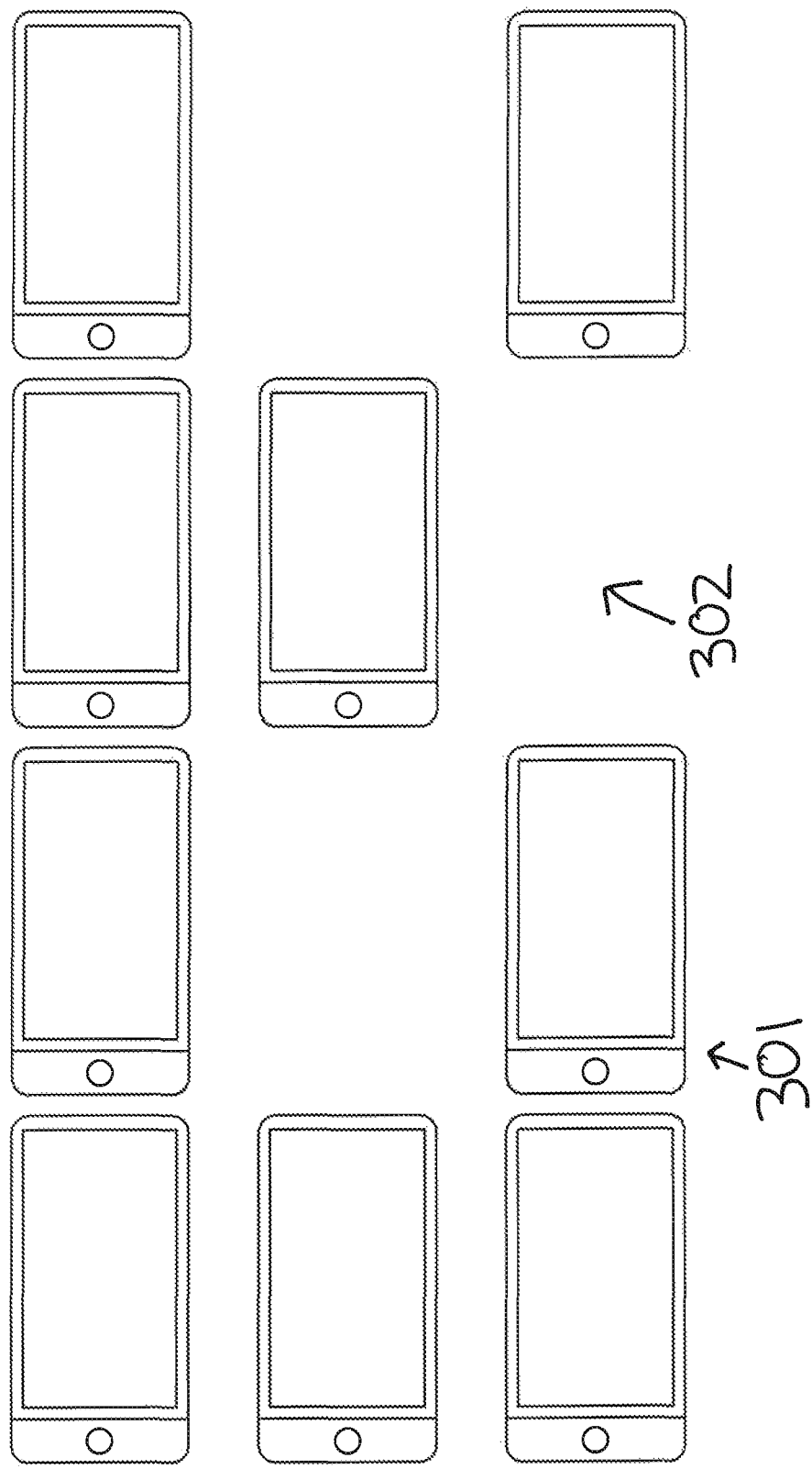
FIG. 3 illustrates an example method for utilizing multiple computing devices to present digital content in which the number and placement of the computing devices corresponds to the content that is presented.

Particular embodiments may also allow users to unlock and consume content depending on the number of users and the orientation of their computing devices. For example, in the example embodiment illustrated in FIG. 3, nine computing devices are spread out over a three by four grid. The content presented by each computing device may be determined by the number of devices in the grid and the orientation and location of each device within that grid. For example, when the main character Jeff Jefferies of Alfred Hitchcock's movie "Rear Window" looks out of his window onto the apartment building behind his building, each of the devices in the grid may show what can be seen in each of the windows of the apartment building that he is looking at. If the computing device 301 is moved up or to the right by a one space (or by any portion of one space), the content presented by 301 may change to reflect the change in position. In some embodiments, if an additional computing device is added to the grid, for example if a tenth computing device is added to space 302, the display of the new device may present content which relates to the content of all other computing devices. Additionally, the content presented by all of the computing devices may change (e.g., get brighter, show more detail, change focus, etc.). In this way, some embodiments may allow for particular content to be unlocked only when a threshold number of computing devices are present.

Figure 4:
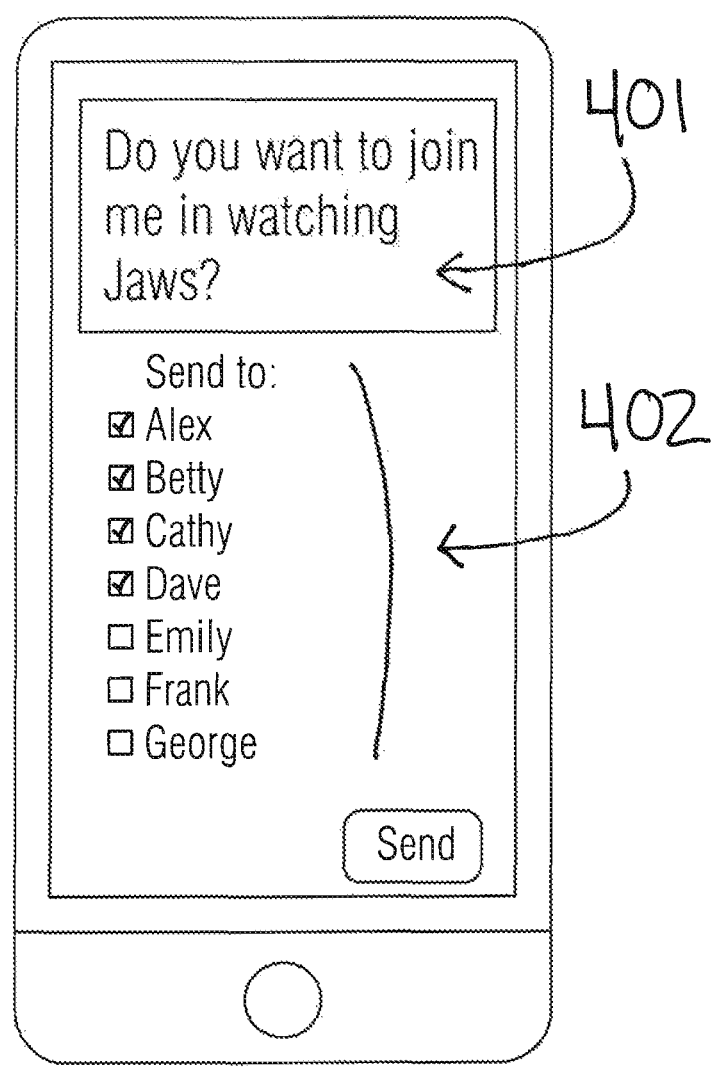
FIG. 4 illustrates an example user interface with which a user may invite other users to jointly consume digital content.

FIG. 4 shows an example interface with which a first user may invite additional users to jointly consume digital content. In some embodiments, a user may need to utilize such an interface to invite and connect with additional users. In other embodiments, each computing device may monitor in real time for other computing devices in proximity, thereby making a structured invitation process unnecessary. In the example embodiment presented in FIG. 4, a first user may have already selected a digital content item to consume, in this case the movie "Jaws" 401. In some embodiments, the invitation to jointly consume content may come before, after, or at the same time as the selection of the digital content item. In addition to selecting a content item, a first user may select additional users to be invited to jointly consume the digital content. In some embodiments, the first user may select from a list of contacts 402: Alex, Betty, Cathy, Dave, Emily, Frank, George, etc. The contacts listed may be based on the contacts stored by the computing device, the first user's social-network connections, or from any number of other sources. In some embodiments, the contacts list may be filtered or ranked based on a social affinity between a first user and one or contacts. In some embodiments, the contacts list may be filtered or ranked based on any number of additional social-networking system factors, including the status, age, location, content preferences, gender, or other characteristic, preference, group affiliation, content viewing history, user interaction history, event attendance history, or attribute of one or more users. Once the first user is satisfied with his or her selection of additional users to invite, he or she may choose to send the invitations. In some embodiments, invitations may only be sent when the users are already in proximity to each other, while in other embodiments, the invitation may be sent while the users are not in proximity and may serve as an invitation to congregate together.

Figure 5A:
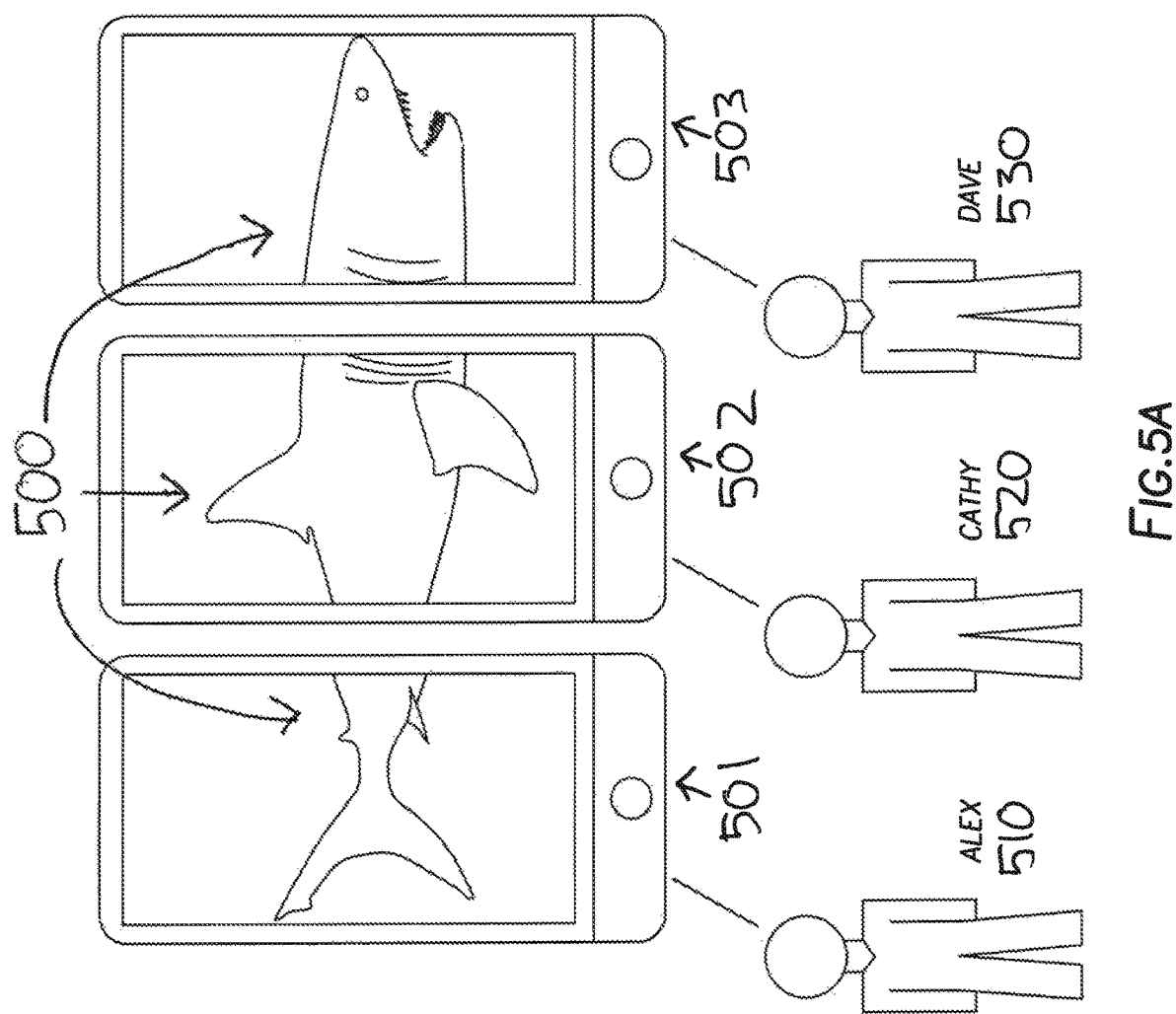
FIG. 5A illustrates an example of users congregating to jointly consume digital content.
Figure 5B:
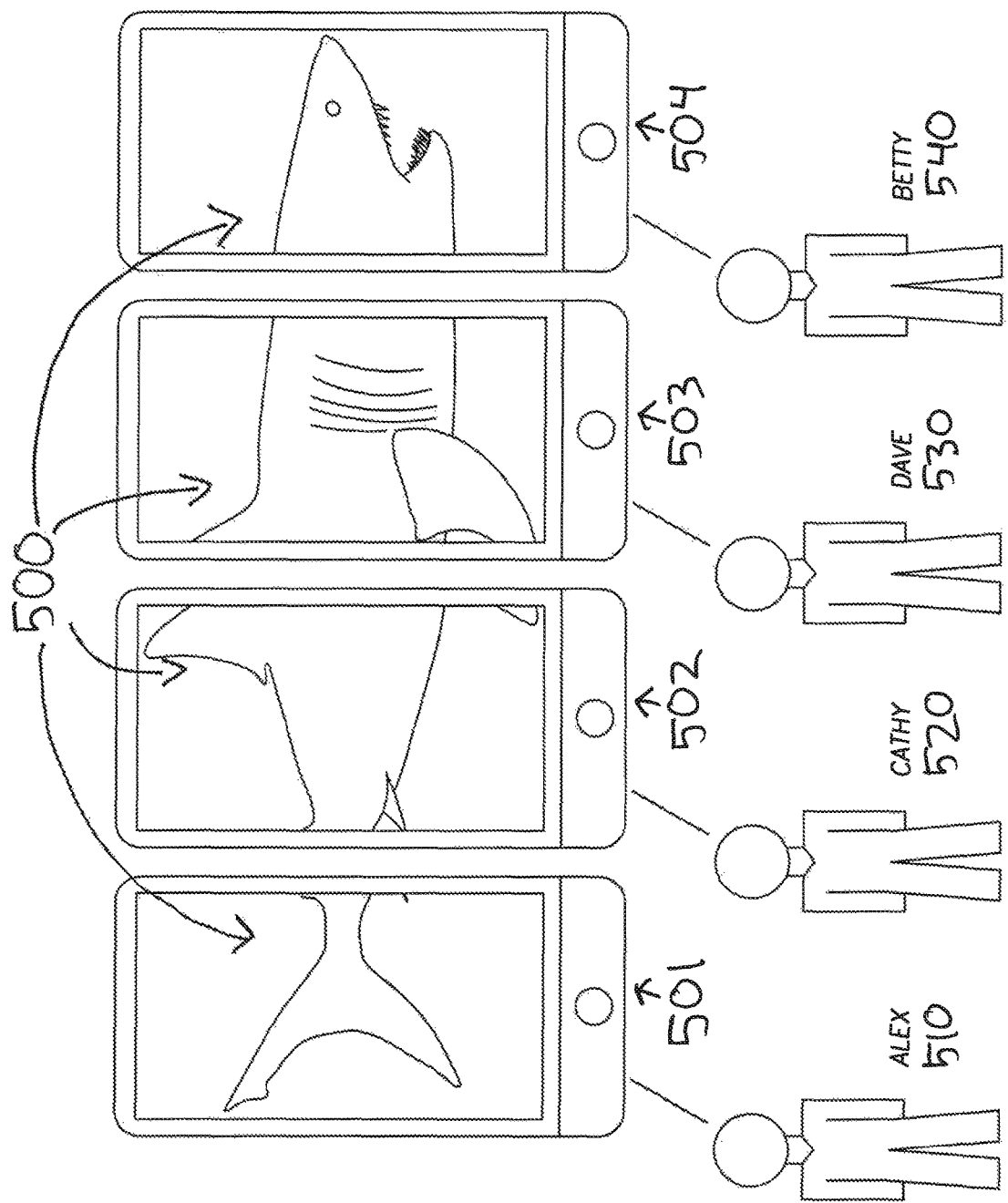
FIG. 5B illustrates an example of an increased number of users congregating to jointly consume digital content where the increased number of congregating users corresponds to an increase in the number of displays across which the digital content is presented.

FIG. 5A illustrates what may happen when users who were previously invited to consume content, Alex 510, Cathy 520, and Dave 530, have congregated in the same physical location. Upon congregating in the same location, Alex, Cathy, and Dave may begin jointly consuming content 500 which is spread out across their respective computing devices 501, 502, and 503—in this case, a scene from the movie "Jaws." FIG. 5B illustrates what may happen once a fourth invited user, Betty 540, joins the other users. In some embodiments, Betty's computing device 504 may automatically connect with the computing devices of Alex, Cathy, and Dave, and begin presenting additional content from the movie "Jaws." In particular embodiments, Betty's computing device may not automatically connect, and the users may be required to restart the media in order to include Betty's computing device.

In particular embodiments, the system may adapt the content based on the characteristics and capabilities of the computing devices that are being used to present content. The adaptations may include cropping the content (e.g., to select portions of each frame and/or to modify aspect ratio(s)), adjusting the frames per second, resolution, or compression rate, etc. As an example, the system may determine that one of the devices is connected to a high-speed LTE network, whereas another one of the devices is connected to a heavily-loaded 4G network (which may not be able to stream the content at the same rate), and thereby stream the content to the two devices at a lower resolution or lower rate of frames per second, so that the displays are uniform. In some embodiments, the system may also similarly monitor bandwidth or any other phone attribute which could result in inconsistency across the display.

Figure 6:
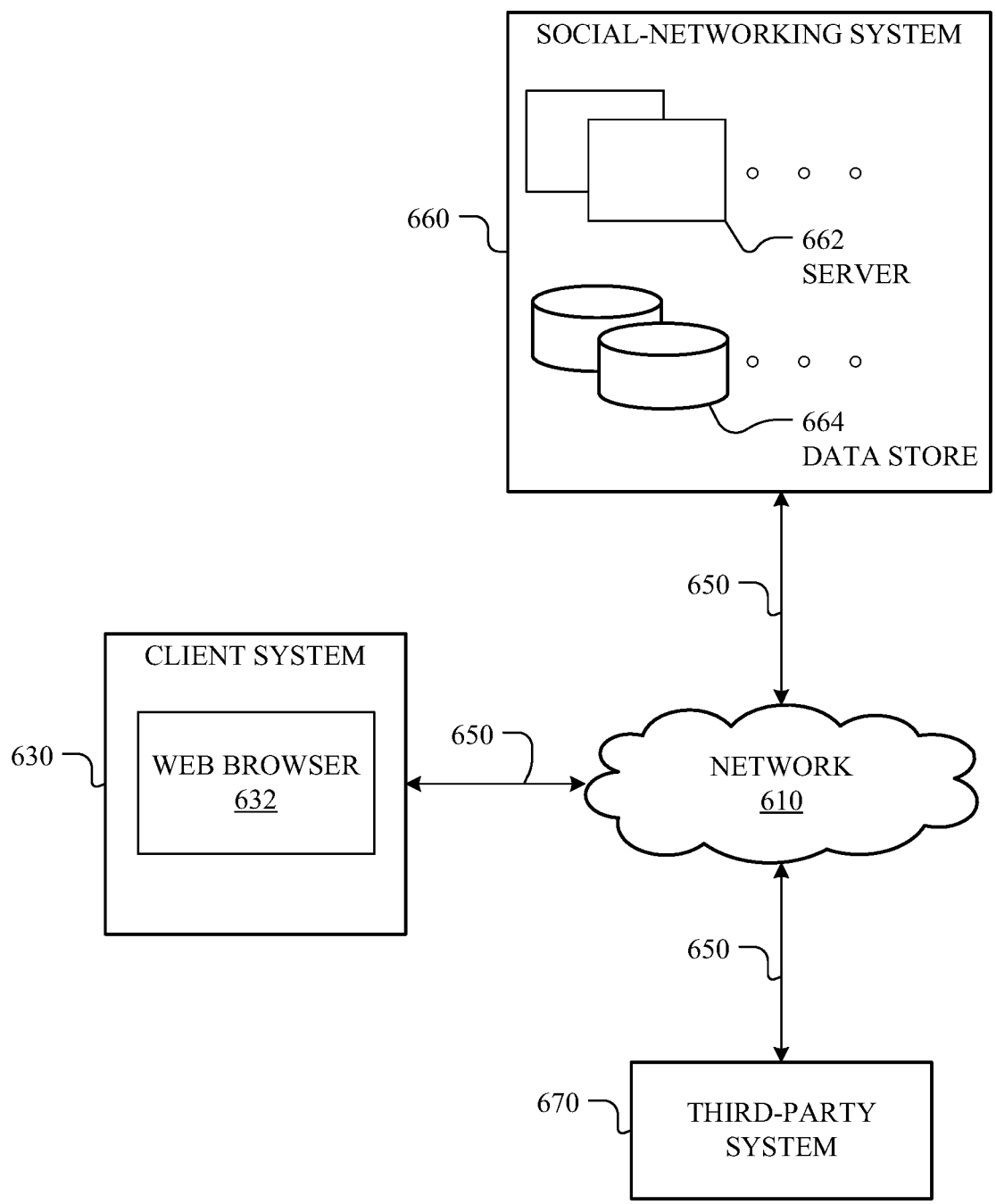
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Social Graphs

Figure 7:
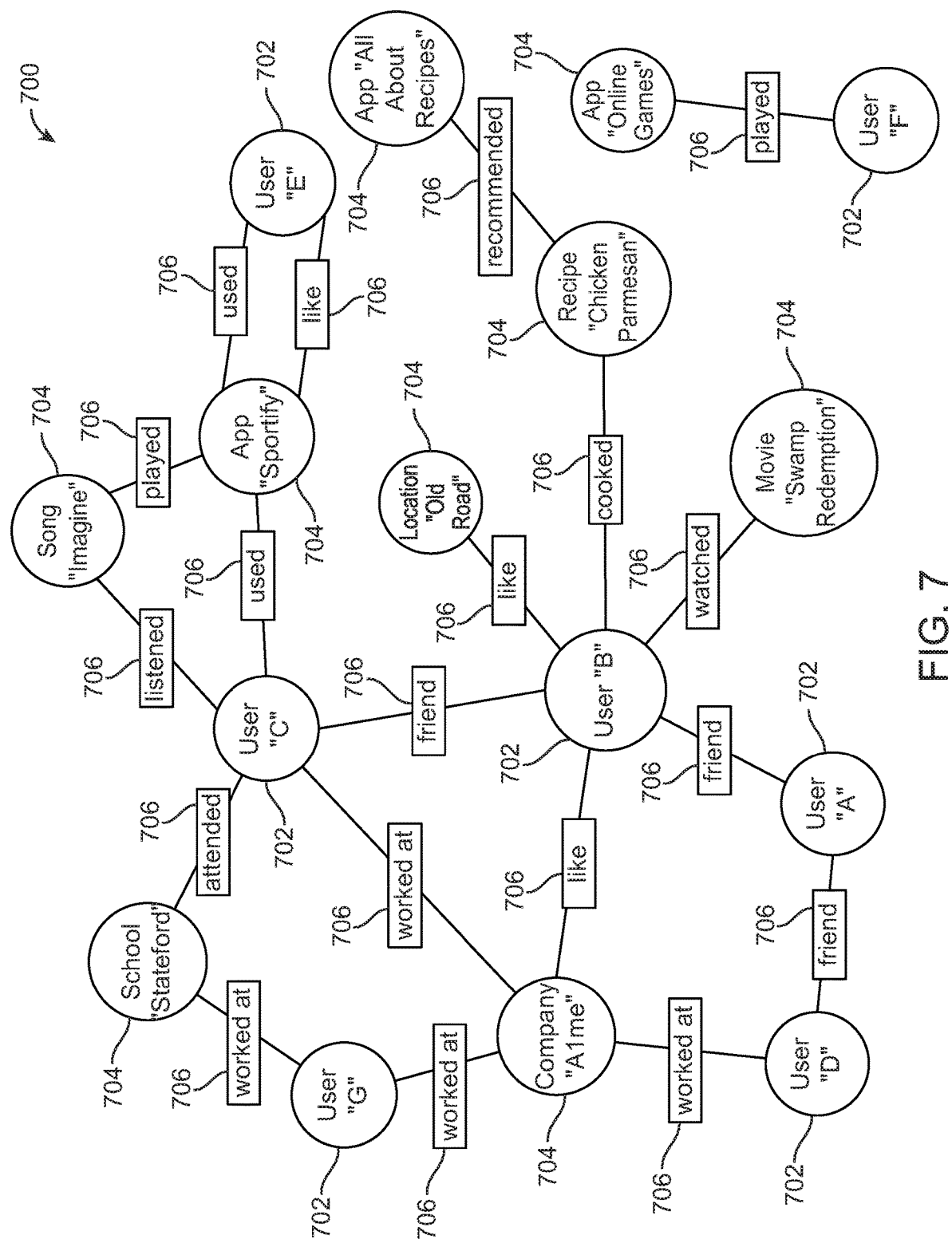
FIG. 7 illustrates an example social graph.

FIG. 7 illustrates example social graph 700. In particular embodiments, social-networking system 660 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular embodiments, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706. The degree of separation between two objects represented by two nodes, respectively, is a count of edges in a shortest path connecting the two nodes in the social graph 700. As an example and not by way of limitation, in the social graph 700, the user node 702 of user "C" is connected to the user node 702 of user "A" via multiple paths including, for example, a first path directly passing through the user node 702 of user "B," a second path passing through the concept node 704 of company "Acme" and the user node 702 of user "D," and a third path passing through the user nodes 702 and concept nodes 704 representing school "Stanford," user "G," company "Acme," and user "D." User "C" and user "A" have a degree of separation of two because the shortest path connecting their corresponding nodes (i.e., the first path) includes two edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 660 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 660 may create a "played" edge 706 (as illustrated in FIG. 7) between concept nodes 704 corresponding to the song and the application to indicate that the particular song was played by the particular application. In this case, "played" edge 706 corresponds to an action performed by an external application on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704).

In particular embodiments, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular embodiments, social-networking system 660 may store an edge 706 in one or more data stores. In particular embodiments, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Figure 8:
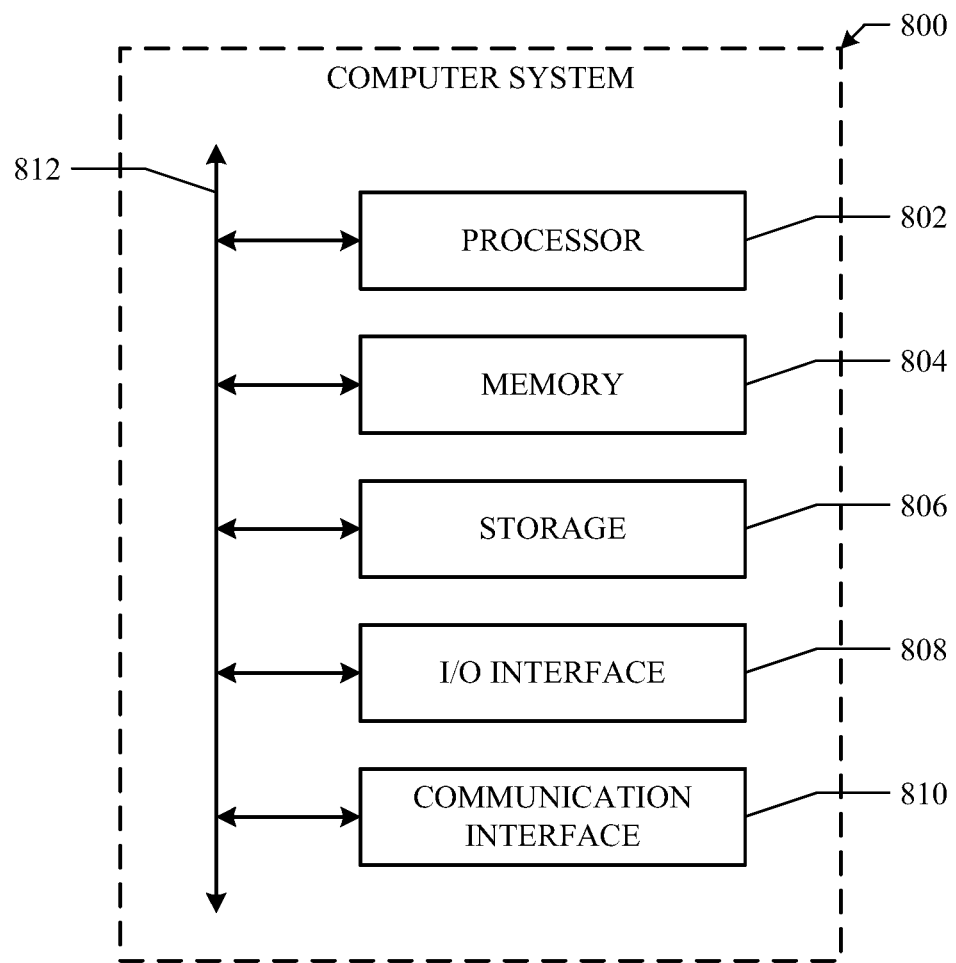
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface. [67] In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a server computing device, in response to receiving a user input selecting a digital content from one client computing device of a plurality of client computing devices, generating an invitation to congregate to one or more other client computing devices of the plurality of computing devices, wherein the invitation specifies a physical location for viewing the digital content;
by the server computing device, sending the invitation to congregate to the one or more other client computing devices;
by the server computing device, determining whether the plurality of client computing devices are in physical proximity to one another;
by the server computing device, generating respective adaptations of the digital content for display by the plurality of client computing devices, wherein each of the respective content adaptations presents a different content view configured for a specific one of the client computing devices, and wherein the respective content adaptations are configured for synchronous presentation on the client computing devices; and
by the server computing device, sending each of the respective content adaptations to one of the client computing devices.

2. The method of claim 1, wherein determining whether the plurality of client computing devices are in physical proximity to one another comprises:
generating a code;
sending the generated code to one of the client computing devices;
receiving, from an other one of the client computing devices, an image of the generated code as captured by the other one of the client computing devices; and
comparing the image with the generated code to validate the other one of the client computing devices.

3. The method of claim 1, wherein determining whether the plurality of client computing devices are in physical proximity to one another comprises, by a first one of the plurality of client computing devices, actively listening for signals indicating that a second one of the plurality of client computing devices has moved within a threshold distance of the first client computing device.

4. The method of claim 3, wherein the signals comprise one or more types of signals adapted for close-proximity communication between devices including near field communication (NFC), infrared, Bluetooth Low Energy (BTLE), radio-frequency identification (RFI).

5. The method of claim 1, wherein generating the respective content adaptations comprises dividing the digital content into spatial view partitions, wherein a number of spatial view partitions is equal to a number of the client computing devices, wherein each of the spatial view partitions is associated with a respective one of the client computing devices.

6. The method of claim 1, further comprising:
monitoring position orientation information for each of the client computing devices, wherein generating the content adaptations is based at least in part on the position and orientation information.

7. The method of claim 1, wherein selecting the digital content is based at least on a social affinity, status, age, location, gender, content preference, group affiliation, content viewing history, user interaction history, event attendance history, or attribute of the one or more other users.

8. The method of claim 1, further comprising:
obtaining a plurality of user profiles, wherein each of the user profiles corresponds to a user of one of the client computing devices;
ranking the user profiles based at least in part on a social affinity, status, age, location, gender, content preference, group affiliation, content viewing history, user interaction history, event attendance history, or attribute of a user of a client computing device, wherein the one or more other users are selected from the ranked user profiles.

9. One or more computer-readable non-transitory storage media embodying software that is operable when executed to:
in response to receiving a user input selecting a digital content from one client computing device of a plurality of client computing devices, generate an invitation to congregate to one or more other client computing devices of the plurality of computing devices, wherein the invitation specifies a physical location for viewing the digital content;
send the invitation to congregate to the one or more other client computing devices;
determine whether the plurality of client computing devices are in physical proximity to one another;
generate respective adaptations of digital content for display by the plurality of client computing devices, wherein each of the respective content adaptations presents a different content view configured for a specific one of the client computing devices, and wherein the respective content adaptations are configured for synchronous presentation on the client computing devices; and
send each of the respective content adaptations to one of the client computing devices.

10. The media of claim 9, wherein determining whether the plurality of client computing devices are in physical proximity to one another comprises:
generating a code;
sending the generated code to one of the client computing devices;
receiving, from an other one of the client computing devices, an image of the generated code as captured by the other one of the client computing devices; and
comparing the image with the generated code to validate the other one of the client computing devices.

11. The media of claim 9, wherein determining whether the plurality of client computing devices are in physical proximity to one another comprises, by a first one of the plurality of client computing devices, actively listening for signals indicating that a second one of the plurality of client computing devices has moved within a threshold distance of the first computing device.

12. The media of claim 11, wherein the signals comprise one or more types of signals adapted for close-proximity communication between devices including near field communication (NFC), infrared, Bluetooth Low Energy (BTLE), radio-frequency identification (RFI).

13. The media of claim 9, wherein generating the respective content adaptations comprises dividing the digital content into spatial view partitions, wherein a number of spatial view partitions is equal to a number of the client computing devices, wherein each of the spatial view partitions is associated with a respective one of the client computing devices.

14. The media of claim 9, further comprising:
monitoring position orientation information for each of the client computing devices, wherein generating the content adaptations is based at least in part on the position and orientation information.

15. The media of claim 9, wherein selecting the digital content is based at least on a social affinity, status, age, location, gender, content preference, group affiliation, content viewing history, user interaction history, event attendance history, or attribute of the one or more other users.

16. The media of claim 9, further comprising:
obtaining a plurality of user profiles, wherein each of the user profiles corresponds to a user of one of the client computing devices;
ranking the user profiles based at least in part on a social affinity, status, age, location, gender, content preference, group affiliation, content viewing history, user interaction history, event attendance history, or attribute of a user of a computing device, wherein the one or more other users are selected from the ranked user profiles.

17. A system comprising:
one or more processors; and
one or more computer-readable non-transitory storage media coupled to one or more of the processors and comprising instructions operable when executed by one or more of the processors to cause the system to:
in response to receiving a user input selecting a digital content from one client computing device of a plurality of client computing devices, generate an invitation to congregate to one or more other client computing devices of the plurality of computing devices, wherein the invitation specifies a physical location for viewing the digital content;
send the invitation to congregate to the one or more other client computing devices;
determine whether the plurality of client computing devices are in physical proximity to one another;
generate respective adaptations of digital content for display by the plurality of client computing devices, wherein each of the respective content adaptations presents a different content view configured for a specific one of the client computing devices, and wherein the respective content adaptations are configured for synchronous presentation on the client computing devices; and
send each of the respective content adaptations to one of the client computing devices.

18. The system of claim 17, wherein determining whether the plurality of client computing devices are in physical proximity to one another comprises:
generating a code;
sending the generated code to one of the client computing devices;
receiving, from an other one of the client computing devices, an image of the generated code as captured by the other one of the client computing devices; and
comparing the image with the generated code to validate the other one of the client computing devices.

* * * * *